(12) United States Patent
Hubbs

(10) Patent No.: US 9,557,001 B2
(45) Date of Patent: Jan. 31, 2017

(54) COMBINATION PORTABLE INDUSTRIAL/SURVEY INSTRUMENT STAND WITH CONVEYANCE CAPACITIES

(71) Applicant: William O Hubbs, Cedar Hill, MO (US)

(72) Inventor: William O Hubbs, Cedar Hill, MO (US)

(73) Assignee: Hubbs Machine & Manufacturing, Inc., Cedar Hill, MO (US)

( * ) Notice: Subject to any disclaimer, the term of this patent is extended or adjusted under 35 U.S.C. 154(b) by 0 days.

(21) Appl. No.: 14/756,833

(22) Filed: Oct. 20, 2015

(65) Prior Publication Data

US 2016/0131303 A1 May 12, 2016

Related U.S. Application Data

(60) Provisional application No. 62/123,113, filed on Nov. 7, 2014.

(51) Int. Cl.

| | | |
|---|---|---|
| *B62B 1/12* | (2006.01) |
| *F16M 11/42* | (2006.01) |
| *F16M 11/32* | (2006.01) |
| *F16M 11/28* | (2006.01) |
| *F16M 11/24* | (2006.01) |
| *F16M 11/34* | (2006.01) |
| *F16M 11/36* | (2006.01) |

(52) U.S. Cl.
CPC ............... *F16M 11/42* (2013.01); *B62B 1/125* (2013.01); *F16M 11/24* (2013.01); *F16M 11/28* (2013.01); *F16M 11/32* (2013.01); *F16M 11/34* (2013.01); *F16M 11/36* (2013.01)

(58) Field of Classification Search
CPC .. B62B 1/008; B62B 1/04–1/047; F16M 11/32; F16M 11/34; F16M 11/36; F16M 11/42
See application file for complete search history.

(56) References Cited

U.S. PATENT DOCUMENTS

| | | | |
|---|---|---|---|
| 215,033 A | | 5/1879 | Wright et al. |
| 366,833 A | | 7/1887 | Hipwell |
| 664,976 A | | 1/1901 | Sheffy et al. |
| 2,368,740 A | | 2/1945 | Blomgren |
| 2,828,097 A | | 3/1958 | Faunce |
| 2,899,204 A | | 8/1959 | Ratay |
| 2,990,764 A | * | 7/1961 | Wilder .................... F16M 11/42 182/127 |
| 3,104,889 A | * | 9/1963 | Branch, Jr. ............... B62B 1/12 182/20 |
| 3,121,556 A | * | 2/1964 | Faulkner ............... B64F 5/0036 16/33 |
| 3,137,522 A | | 6/1964 | Smith |
| 3,667,773 A | * | 6/1972 | Hess ...................... F16M 11/42 248/186.1 |

(Continued)

*Primary Examiner* — Katy M Ebner
(74) *Attorney, Agent, or Firm* — Paul M Denk

(57) ABSTRACT

A tripod with accessories, including a tripod having three pivotal legs that when extended finds support upon the ground, and when retracted, incorporates a pair of lateral wheels that allow for the tripod to be moved as a dolly, the wheels are provided upon two of the tripod legs, and the third or back leg has an equipment platform, upon which equipment may be applied, to facilitate their movement when the tripod is collapsed, titled forwardly, to cart the equipment around with the tripod to other locations within in a plant or upon the ground.

10 Claims, 2 Drawing Sheets

(56) References Cited

U.S. PATENT DOCUMENTS

| | | | |
|---|---|---|---|
| 3,826,513 A * | 7/1974 | Wolf | F16M 11/42 |
| | | | 280/47.131 |
| 3,863,945 A * | 2/1975 | Dunstan | F16M 11/42 |
| | | | 280/35 |
| 4,120,280 A | 10/1978 | Iverson et al. | |
| 4,253,546 A * | 3/1981 | Uchida | B62B 1/12 |
| | | | 182/20 |
| 4,423,849 A | 1/1984 | Jordan | |
| 4,494,626 A * | 1/1985 | Ast | B62B 1/10 |
| | | | 182/106 |
| 4,717,108 A | 1/1988 | Liedle | |
| 4,852,836 A * | 8/1989 | Kawazoe | F16M 11/32 |
| | | | 248/168 |
| 5,029,795 A | 7/1991 | Dexter | |
| 5,145,133 A | 9/1992 | France | |
| 5,401,043 A * | 3/1995 | Myron | B62B 1/125 |
| | | | 280/42 |
| 5,836,595 A * | 11/1998 | Brice | B62B 1/12 |
| | | | 182/20 |
| 6,007,031 A * | 12/1999 | Tang | B62B 1/045 |
| | | | 206/315.3 |
| 6,471,220 B1 * | 10/2002 | Babb | B25H 1/04 |
| | | | 280/30 |
| 7,172,512 B2 | 2/2007 | Be | |
| 7,581,703 B1 | 9/2009 | Coleman et al. | |
| 7,604,207 B2 * | 10/2009 | Hasloecher | F16M 11/20 |
| | | | 16/32 |
| 7,614,628 B2 * | 11/2009 | O'Connor | A45C 5/143 |
| | | | 280/37 |
| 7,946,588 B1 | 5/2011 | Hockman et al. | |
| 8,714,508 B1 | 5/2014 | Young et al. | |
| 8,720,895 B2 | 5/2014 | Matthis | |
| 8,780,263 B2 | 7/2014 | Orf | |
| 8,820,693 B1 | 9/2014 | Young et al. | |
| 8,836,508 B2 | 9/2014 | Taylor et al. | |
| 8,858,097 B2 | 10/2014 | Hale | |
| 9,278,703 B1 * | 3/2016 | Hollub, IV | B25H 1/04 |
| 2008/0197587 A1 * | 8/2008 | Nowak | B62B 1/264 |
| | | | 280/30 |

* cited by examiner

COMBINATION PORTABLE INDUSTRIAL/SURVEY INSTRUMENT STAND WITH CONVEYANCE CAPACITIES

CROSS REFERENCE TO RELATED APPLICATION

This regular letters patent application claims priority to the provisional patent application having Ser. No. 62/123,113, filed on Nov. 7, 2014.

FIELD OF THE INVENTION

This invention relates to the structure of a tripod, and modifications to it, of the type that is used to hold laser tracking systems, theodolites, wherein the modified tripod incorporates lateral wheels that allow it to be conveyed over rough surfaces, the ground, in the field, and for great distances, while at the same time, having a dolly-like stand for support of the various equipment to be used during application of the tripod, when it is transferred during and in the work environment.

BACKGROUND OF THE INVENTION

Tripods have been available for many, many years. They come in all shapes and sizes, some very small to hold cameras, or small telescopes, others are larger for holding surveying instruments, to elevate them to an eye-level position. Tripods usually have three extendable legs, that can be shifted into greater length or leveled, in order to provide an upper stand for the mounting of the instrument when employed. Such instruments may include theodolites, transits, laser trackers, and many other instruments known in the art. Usually there is also a center post that can be elevated, to bring the platform of the transit up to a reasonable height during usage.

In close tolerance industrial surveys, various survey instruments such as laser trackers, scanners, laser projectors, and portable CMMS are mounted onto the top of the industrial survey instrument stand. Generally, these are oversized camera tripods. Popular models are of the portable tripod type design. There are a good number of companies that have been manufacturing and marketing such stands for many years.

As known, and to this date, the only tripod that has any movable or shiftable features, includes a tripod with very small casters at the bottom of each leg. These types of casters are used for rolling around a room and not for traveling any great distance, particularly when used in a large plant, or even during outdoor applications, such as in conjunction with surveying equipment.

Examples of various types of tripods can be seen in select U.S. patents.

Various types of tripods and stands have long been available in the art. Some of the more current ones can be seen, for example, in the U.S. Pat. No. 8,836,508, upon an apparatus and method for securing a portable electronic device. A tripod that includes a case for holding equipment, can be seen in U.S. Pat. No. 8,702,895, disclosing a portable archery target support.

Other early patents relating to tripods can be seen in U.S. Pat. No. 366,833, U.S. Pat. No. 2,828,097, U.S. Pat. No. 2,899,204, a tripod like table with fastening means as shown in U.S. Pat. No. 3,137,522; a tripod supported grill as disclose in U.S. Pat. No. 4,120,280; U.S. Pat. No. 5,029,765, showing a camera support stand; a target holder having adjustable legs as can be seen in U.S. Pat. No. 5,145,133; and a tripod like frame support as shown in U.S. Pat. No. 7,172,512.

SUMMARY OF THE INVENTION

This invention contemplates the construction and enhancements to the tripod, initially in the addition of larger sized wheels structured to the approximate bottom of a pair of the tripod legs, where the wheels are arranged in horizontal position generally with the legs, and to each other such, that when the tripod is collapsed, and the legs of the tripod are telescopically elevated, the wheels can be used as a cart in conjunction with the tripod for moving it greater distances, even over rough surfaces, such as during outdoor usage, something that has not been available heretofore in the art.

In addition, the third or back leg of the tripod will include a dolly-like angulated support structure, rigidly secured to the exterior of the third tripod leg, so that various instruments, such as the laser tracking instruments, a theodolite, even a computer, may be rested on the structured support, and be strapped or otherwise fastened in place, to provide an easy way to cart various equipment around to different locations, when such is required. The structure of the cart itself generally will be a pair of angled plates, one plate being secured to the exterior of the third leg, while the bottom plate is angulated at approximately a 90° angle from the first plate, to provide a supporting surface. Such supporting structure may include the compound plates as identified, or may even be a basket, a wire formed cart, a form of box, such as a wire box, into which the equipment may be located, and may further include various types of strap or other fastening means, to secure the equipment in place, during conveyance.

To round out the facility of this improved structure for a tripod, a removable handle may be secured to the pivot plate that has the various three legs of the tripod pivotally connected therewith, and the handle may either be adjustable, so that it may be slid upwardly to provide adequate clearance for grasping by the hand, when it is desired to utilize the tripod as a cart, for conveyance of equipment. Or, the handle may be removable from the pivot plate, so it can be entirely freed and removed while the technical equipment is applied to the tripod stand, as during usage. Further, the handle may be secured with the pivot plate through a telescopic connection, and be lowered, to clear it from the tripod plate, during usage with its various instrumentation.

These are examples of the various modifications that may be made to a tripod, to attain the benefits and enhancements offered by these accessories when constructed into the formation of the tripod, in preparation for its facile usage.

As previously reviewed, when a technician enters to start a survey project, generally, he/she must bring an assortment of equipment with them. This would include the instrument, and probably some sort of a carrying case, maybe a tool box, and of course, the stand to support the instrument. All of this is either carried by hand, or is hauled on some form of a wagon, or push cart, if such is available. Nevertheless, it offers a variety of many pieces of equipment, that must be conveyed to a distant location, and most often, requires a trip or two before usage of the equipment can begin. Thus, the idea of this invention is to create a quality, stable portable industrial survey instrument stand, that is a cross between a tripod instrument stand, and a two-wheeled dolly, all modified and integrated into the structure of the tripod, readily available for all of its benefits during usage.

The tripod itself, when the three legs are retracted, will serve as a dolly, as previously explained, to carry the variety of equipment, even over rougher surfaces such as gravel or paved parking lots, for long distances over broken or uneven floors, as in a factory. Once the destination is reached, the technician will simply set the two-wheeled tripod down, normally to unload the equipment and other baggage, then expand the three legs of the tripod, extend the legs to the required length and height, remove the dolly handle or lower it, raise the center post, and attach the survey and other instrument thereto.

During usage, to set up the combined portable tripod, as prepared for travel, all the legs would be shortened as much as possible, and the three legs are then retracted inwardly and locked into their closed position. At this time, both wheels and luggage platform would then make contact with the ground, to maintain the stability of the erected, but collapsed, tripod. The wheels are designed to be located laterally of the legs, so they would be in a parallel arrangement under this condition, and allow the unit to be rolled thereon, as like a dolly. Equipment can be placed on the luggage platform, held in position, and readied for transit. The user then only needs to install or elevate the dolly handle, tilt the entire unit forwardly, as you do with any two-wheeler, and under this condition, the instrument stand or tripod then serves as a conventional two-wheeled dolly for moving equipment. When collapsed, the wheels are maintained in parallel, and greatly facilitates the movement of the stand, laden with other equipment and instruments.

It is, therefore, the principal object of this invention to provide a combination portable industrial survey instrument stand with conveyance capabilities, particularly when moving heavy or delicate instruments to another location.

A further object of this invention is to provide the application of a pair of wheels, laterally to tripod legs, to function as a dolly or cart, when it is moved to another and distant location.

Furthermore, a further object of this invention is to modify a tripod with a handle, to facilitate usage of the tripod as a conveying means.

Another object of this invention is to provide and furnish conveyance features to a tripod stand, to facilitate movement of equipment.

Yet another object of this invention is to provide a removable or adjustable handle to a tripod stand, to facilitate its handling.

These and other objects may become more apparent to those skilled in the art on review of the summary of the invention as provided herein, and on undertaking a study of the description of its preferred embodiment, in view of the drawings.

DESCRIPTION OF THE PREFERRED EMBODIMENT

Figure 1:
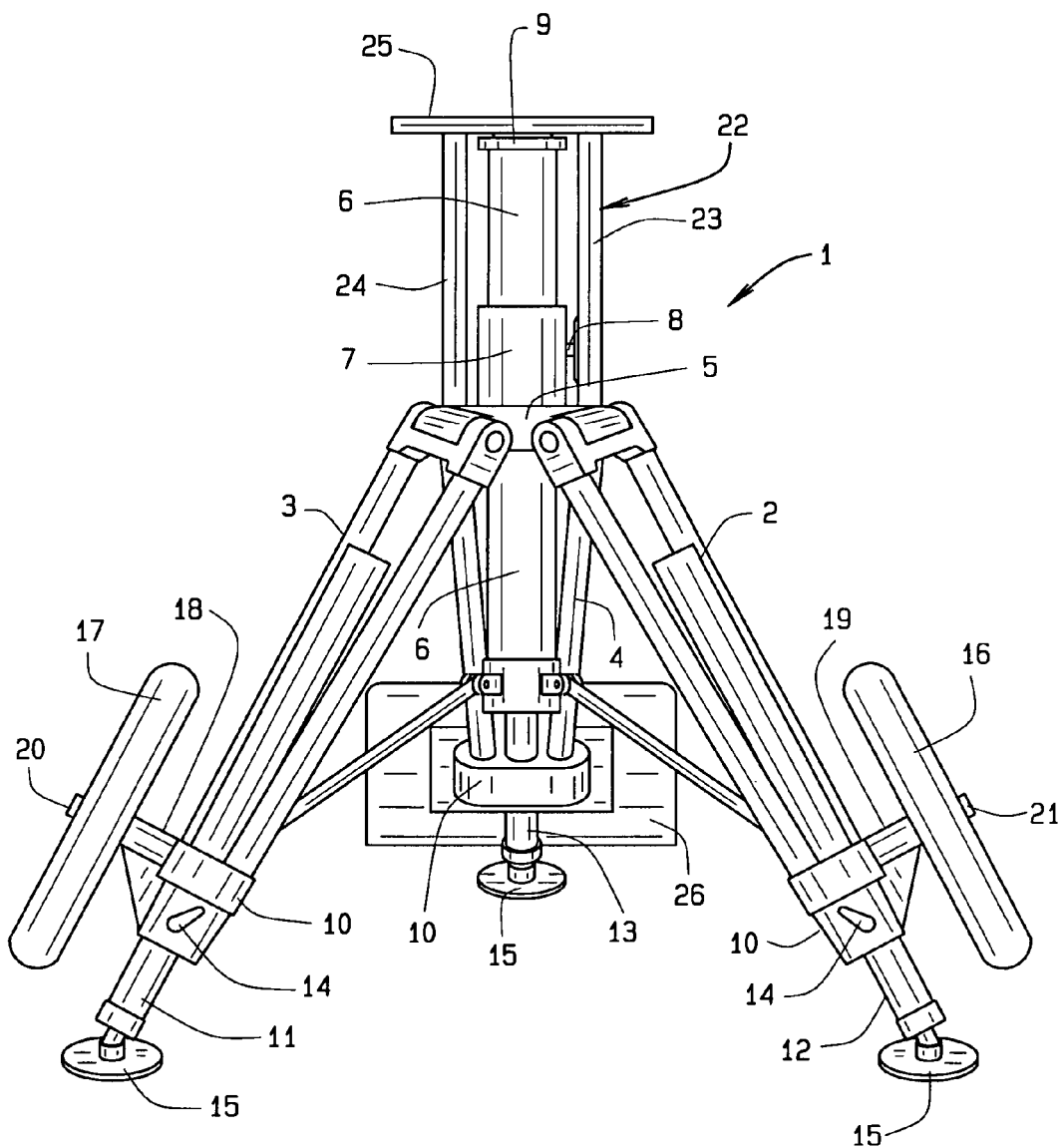
FIG. 1 provides an operative front view of a tripod erected and readied for application with instrumentation for use for surveying or laser tracking purposes.

In referring to the drawings, and in particular FIG. 1, therein as shown the tripod 1 with the accessories of this invention. The tripod, as usual, includes three legs, 2-4, which are usually pivotally mounted to a pivot plate 5. The pivot plate includes a center post 6 that elevates upwardly, and is telescopically formed with its column 7, so that the post 6 can be elevated, or lowered, within the center sleeve or column 7, and then fastened in position by tightening of the fastener 8 as known in the art. The upper end of the center post has a formed plate 9 and it is upon this plate that the theodolite, laser tracker, transit, or other instrumentation may be applied, when readied for usage and application.

The tri-legs 2-4, are usually designed to further function as pivotal legs, as identified, and at their bottom end includes sleeves, as at 10, so the lower extendable legs 11-13 can be extended, to increase the height of the tripod, and then its fasteners 14 may be secured, to fix the adjusted lengthened legs into their set position. Usually, the bottom of each leg will have a base 15 in order to provide for stable mounting of the tripod upon a surface, even uneven surfaces, when it is set up for usage.

The added accessories of this particular invention are threefold, the addition of larger wheels 16 and 17, bearing mounted to their wheel shafts 18 and 19, and secured by their wheel axle 20 and 21, to allow for the wheels to freely turn about their axles, when used. The wheel shafts 18 and 19 are integrally formed with the sleeves 10, and extend laterally outwardly therefrom, as can be readily noted.

When the tripod is adjusted, and collapse after usage, the wheels will be disposed for riding upon the ground, and allow the entire tripod assembly to be moved as a dolly, or cart, for ease of its conveyance, and to carry other equipment as to be identified hereinafter.

The second aspect of this invention is the incorporation of a handle 22, which includes, in this particular instance, a pair of vertical shafts 23 and 24, and having a cross bar 25 provided thereabove, to function as a handle to allow the tripod to be slanted forwardly to allow its wheels 16 and 17 to ride upon the surface, and to convey the entire instrument in the manner as previously described.

The handle shafts 23 and 24 are extended through the pivot plate 5, and likewise, can be secured or fastened by means of any type of fastener (not showing) similar to the type of fasteners as shown at 14, but in this particular instance, to allow the handle to be fixed in place, when used. The handle 22 is arranged slightly forwardly of the center post 7 in order to furnish clearance for the hand when the handle is to be gripped, for movement of the tripod.

The third aspect of this invention is the inclusion of a support platform or shelve 26, provided affixed to the back leg 4 of the tripod, and this will function as a means for furnishing a location where items may be arranged, fastened in place, to further aid in their conveyance during or after usage.

Figure 2:
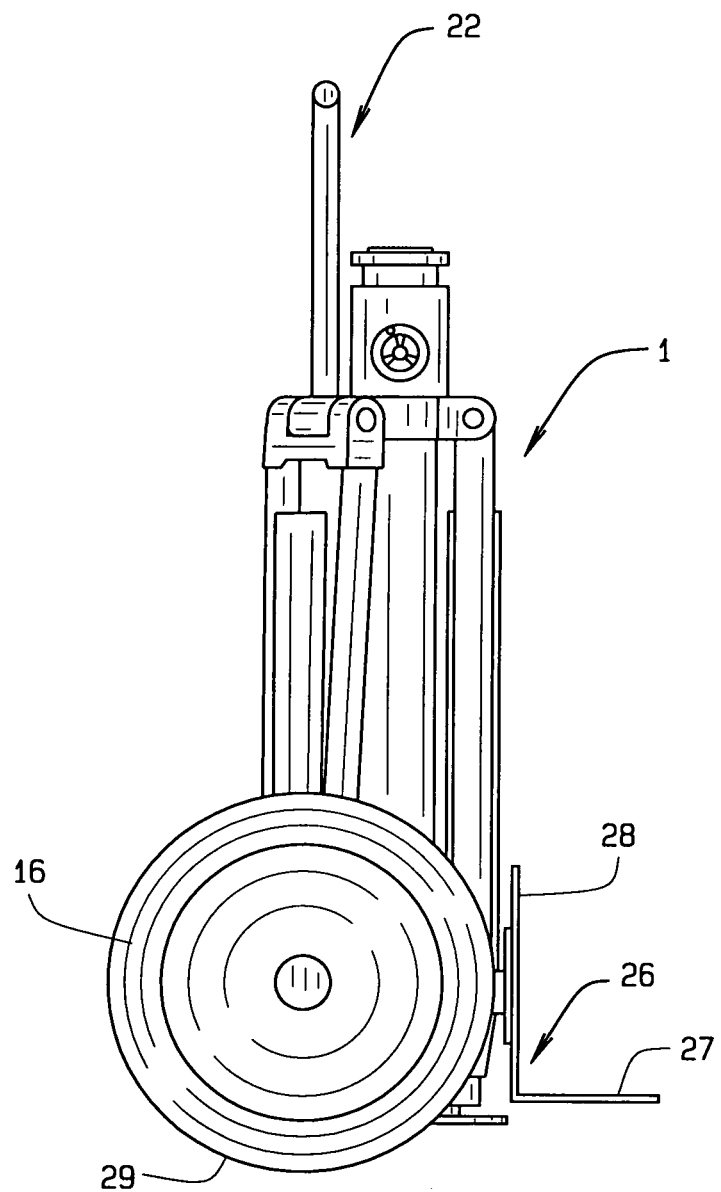
FIG. 2 provides a side view of the tripod, collapsed, handle extended, and readied for usage as a cart or dolly.

FIG. 2 shows the location of the support platform 26, and it includes a base shelf 27, and an upright support 28 that can accommodate the location of the equipment thereon.

While the support platform 26 is shown as an angled structure, it could just as likely be a basket, whether it be a wire basket, or the like, a box, or any other structure into which equipment may locate, during transit. In addition, other forms of straps or fastening means may be included for securement of the equipment thereon, as it is moved over a surface of the plant, outdoors upon the ground, or at other locations.

It is also to be noted that the support platform 27 is generally arranged at the same level as the bottom 29 of the wheels, so that as the tripod 1 is collapsed, it has a three point contact with the surface, in other words, the two wheels, and the support platform 27, to assure that the tripod will remain erect, even when collapsed into its non-usable but conveyable condition, as noted.

It can be seen that the wheels 16 and 17 of the accessorized tripod do have some size, in order to provide clearance for the wheels to ride upon the ground, particularly when the lower legs 12 of the tripod telescope up into their upper legs 2 and 3, to assure that the tripod can be moved upon its wheels, when shifted to a new location. Generally, these wheels may be anywhere from approximately 1 foot to 2 feet or slightly greater in diameter, to provide adequate clearance for the transit to be moved, when tilted forwardly, when used as a dolly. Small bicycle wheels may be useful for this purpose.

Just before any movement, the various equipment may be added onto the angled platform 26, in preparation for usage.

As can also be seen in FIG. 1, when the fasteners 14 are opened, and the lower legs 11 and 12 are shifted upwardly, within the transit legs 2 and 3, their bases 15 will also shift upwardly, to allowed adequate clearance for the wheels 16 and 17 to ride upon the surface of the ground, particularly when the transit is tilted forwardly, grasped by the handle 25, for movement.

Variations or modifications to the subject matter of this invention may occur to those skilled in the art upon review of the description of the invention as provided herein. Such variations, if within the spirit of the invention, are intended to be encompassed within the scope of any claims to patent protection issuing herein. The description of the invention in the preferred embodiment, and its depiction in the drawings, are set forth for illustrative purposes only.

I claim:

1. A tripod with accessories to facilitate its usage, said tripod having a center post, three legs extending pivotally outward from the center post during application, a pair of the legs having lateral wheels, such that when the tripod is tilted forwardly, the wheels contact the surface, and allow the tripod to be conveyed as a dolly;

said tripod legs being adjustable in length, such that when the tripod legs are extended, or rested upon the ground, the wheels are elevated and do not contact the ground, and when the tripod legs are retracted, the wheels contact the ground, and allow the tripod to be moved upon its wheels to a different location;

said tripod has a pivot plate operatively associated with its center post, said pivot plate having the tripod legs pivotally mounted thereto, and a handle removeably attachable with the pivot plate, such that when it is connected there with, the handle provided for grasping to move the tripod upon its wheels for conveyance to a different location;

and said pivot plate has a least one aperture provided therethrough, and said handle has at least one handle shaft, for extension through the pivot plate aperture, to secure the handle in place during movement of the tripod.

2. The tripod with accessories of claim 1, including fastening means engaging with the pivot plate that provides for securement or loosening of the at least one handle shaft within the pivot plate during installation.

3. The tripod with accessories of claim 2, wherein there are a pair of handle shafts connecting to a pair of apertures provided through the pivot plate for securement of the handle to the tripod during conveyance.

4. The tripod with accessories of claim 1, wherein a third leg of the tripod incorporates a platform, capable of holding instrumentation for movement when the tripod is used as a means for conveyance.

5. The tripod with accessories of claim 4, wherein said platform includes a support platform, a connected upwardly extending back support, and an angled shelf providing support for any instrumentation during conveyance of the tripod.

6. The tripod with accessories of claim 5, wherein when the tripod is collapsed, and the pair of wheels contact the ground, the bottom of the wheels have the same level as the support platform of the instrument, to add vertical support for the tripod in preparation for its conveyance.

7. The tripod with accessories of claim 6, wherein the legs of the tripod are telescopically formed, and capable of being reduce in length, in preparation for tripod conveyance.

8. The tripod with accessories of claim 7, wherein each leg of the tripod has a collar provided proximate its lower end, a leg extension fitting through said collar, and fastening means provided for fastening the leg extensions relative to the tripod legs, in preparation for usage or conveyance.

9. The tripod with accessories of claim 8, wherein each of the collars provided upon two of the tripod legs has a wheel shaft extending laterally therefrom, each wheel incorporated an axle, and the axle of each wheel extending into the wheel shaft for accommodating the wheels for rotatable movement when the tripod is conveyed to another location.

10. The tripod with accessories of claim 5, wherein the support for any instrumentation capable of holding one of a theodolite, laser tracker, or transit during conveyance.

* * * * *